United States Patent
Vauclair et al.

(10) Patent No.: US 8,516,258 B2
(45) Date of Patent: Aug. 20, 2013

(54) GENERATOR FOR GENERATING A MESSAGE AUTHENTICATION CODE, METHOD OF GENERATING A MESSAGE AUTHENTICATION CODE, PROGRAM ELEMENT AND COMPUTER-READABLE MEDIUM

(75) Inventors: Marc Vauclair, Louvain (BE); Serret Avila Javier, Heverlee (BE); Ventzislav Nikov, Brüssel (BE)

(73) Assignee: NXP B.V., Eindhoven (NL)

( * ) Notice: Subject to any disclaimer, the term of this patent is extended or adjusted under 35 U.S.C. 154(b) by 1210 days.

(21) Appl. No.: 11/817,783

(22) PCT Filed: Feb. 24, 2006

(86) PCT No.: PCT/IB2006/050590
§ 371 (c)(1),
(2), (4) Date: Jun. 18, 2008

(87) PCT Pub. No.: WO2006/092753
PCT Pub. Date: Sep. 8, 2006

(65) Prior Publication Data
US 2009/0222667 A1   Sep. 3, 2009

(30) Foreign Application Priority Data
Mar. 1, 2005 (EP) .................. 05101537

(51) Int. Cl.
*G06F 21/00* (2006.01)
(52) U.S. Cl.
USPC ............... 713/175; 713/187; 726/28; 380/29; 380/46; 705/57

(58) Field of Classification Search
USPC ....................... 713/175; 380/40, 46
See application file for complete search history.

(56) References Cited

U.S. PATENT DOCUMENTS

| | | | | |
|---|---|---|---|---|
| 5,383,143 | A * | 1/1995 | Crouch et al. | 708/254 |
| 5,664,016 | A | 9/1997 | Preneel et al. | |
| 5,767,784 | A | 6/1998 | Khamharn et al. | |
| 6,457,147 | B1 * | 9/2002 | Williams | 714/703 |
| 6,480,101 | B1 | 11/2002 | Kelly et al. | |
| 6,560,338 | B1 * | 5/2003 | Rose et al. | 380/47 |
| 6,735,693 | B1 * | 5/2004 | Hamlin | 713/168 |
| 6,754,824 | B1 * | 6/2004 | Persson et al. | 713/181 |
| 6,785,389 | B1 * | 8/2004 | Sella et al. | 380/46 |

(Continued)

FOREIGN PATENT DOCUMENTS

| | | |
|---|---|---|
| WO | WO0111818 A2 | 2/2001 |
| WO | WO 0111818 A2 * | 2/2001 |
| WO | WO0111818 A3 | 2/2001 |

OTHER PUBLICATIONS

Meier et al, "The Self-Shrinking Generator", Springer-Verlag, 1998, p. 205-214.*

(Continued)

*Primary Examiner* — Morshed Mehedi

(57) ABSTRACT

Current MAC algorithms impose a significant system performance requirement in order to process messages in real time. According to an exemplary embodiment of the present invention, a hardware implemented generator for generating a MAC is provided, that results in a significant improvement in hardware performance requirements for processing messages in real time. The engine is based on linear feedback shift registers which are adapted to generate secure MACs.

24 Claims, 6 Drawing Sheets

(56) References Cited

U.S. PATENT DOCUMENTS

| | | | |
|---|---|---|---|
| 6,816,968 B1* | 11/2004 | Walmsley | 713/168 |
| 6,993,694 B1* | 1/2006 | Kapur et al. | 714/733 |
| 7,761,764 B2* | 7/2010 | Hurley | 714/740 |
| 7,822,797 B2* | 10/2010 | Buer et al. | 708/252 |
| 2002/0071552 A1* | 6/2002 | Rogaway | 380/37 |
| 2002/0176578 A1* | 11/2002 | LaPat et al. | 380/265 |
| 2003/0002677 A1 | 1/2003 | Dagan et al. | |
| 2003/0133497 A1* | 7/2003 | Kinjo et al. | 375/152 |
| 2007/0140485 A1* | 6/2007 | Ghigo et al. | 380/46 |

OTHER PUBLICATIONS

Shift-Register Synthesis and BCH Decoding IEEE Transactions on Information Theory, vol. IT-15, No. 1 Jan. 1969 pp. 122-127 James L. Massey.

The Linear Complexity of the Self-Shrinking Generator IEEE Transactions on Information Theory, vol. 45, No. 6 Sep. 1999 pp. 2073-2077 S. Blackburn.

The Self-Shrinking Generator Proceedings of Eurocrypt '94 May 9, 1994 pp. 205-214 Meier et al.

Achieving High Encoding Efficiency With Partial Dynamic LFSR Reseeding ACM Transactions on Design Automation of Electronic Systems vol. 9, No. 4 2004 C.V. Krishna et al.

The Shrinking Generator Crypto '93, LNCS 773, 1993 pp. 22-39 D. Coppersmith et al.

Correlation-Immune and Resilient Functions Over a Finite Alphabet and Their Applications in Cryptography Designs, Codes and Cryptography, (16), (1999) pp. 121-149 P Camion et al.

Achieving High Encoding Efficiency With Partial Dynamic LFSR Reseeding ACM Transactions on Design Automation of Electronic Systems, vol. 9, No. 4 2004 C.V. Krishna et al.

Improved Cryptanalysis of the Self-Shrinking Generator ACISP 2001, LNCS 2119 pp. 21-35 Zenner et al.

LFSR-Based Hashing and Authentication Cryypto '94, LNCS 839, 1994 pp. 129-139 H. Krawczyk.

Vulnerability of Nonlinear Filter Generators Based on Linear Finite State Machines FSE '04, LNCS 3017, 2004 pp. 193-209 J. Hong et al.

\* cited by examiner

GENERATOR FOR GENERATING A MESSAGE AUTHENTICATION CODE, METHOD OF GENERATING A MESSAGE AUTHENTICATION CODE, PROGRAM ELEMENT AND COMPUTER-READABLE MEDIUM

The present invention relates to the field of data transmission. In particular, the present invention relates to a generator for generating a message authentication code, a method of generating a message authentication code, a program element and a computer-readable medium.

Almost all message authentication code (MAC) algorithms are constructed over one of the following group of primitives: unkeyed hash functions, such as SHA-1, RIPEMD-160, MD5, and block ciphers, such as DES, AES, IDEA, etc.

In all cases, the schemes result on implementations that require each bit of the message to be processed through at least one execution of either a hash function or a block cipher. Although this may be efficiently implemented on dedicated hardware through deep pipeline setup, this approach leads to the following drawbacks:

Firstly, a significant number of logical gates leading to considerable silicon-area consumption, which is one of the main factors driving chip-manufacturing cost.

Secondly, some noteworthy delay on obtaining the final result after the last bit of the message has been provided to the MACing engine.

Thirdly, high power consumption due to thousands of transistors commuting simultaneously during the whole processing of the message.

Although the first drawback is exacerbated by the deep-pipeline approach, the two latter drawbacks are invariant through all hardware implementations and intrinsic to the algorithms themselves.

In particular, the two latter drawbacks significantly complicate, and in some settings downright preclude, efficient implementations for:
  Systems that require extremely efficient power management, such as always-on stand alone medical devices.
  Systems where the maximum communication speed is paramount, such as the ultra-high speed routers that operate the internet backbones.
  Systems that require strong integrity checking of their externally stored state while operating, such as secure microprocessors that store working data in external RAM.

It would be desirable to provide for a hardware optimized MAC.

In accordance with an exemplary embodiment of the present invention, the above desire may be met by a generator for generating a message authentication code, the generator comprising a first circuit adapted for performing a delinearization of a first data set, resulting in a second data set, wherein the first data set comprises an original code (i.e the plain text), and wherein the delinearization is based on a linear feedback shift register construction and a pseudorandom input.

Advantageously, according to this exemplary embodiment of the present invention, a new MAC generator is provided, that uses linear feedback shift registers (LFSRs) as its main security engine. Because of the innovative mechanism used to leverage the LFSR-generated stream, current know-how developed to attack these schemes is not directly applicable to the new design.

According to another exemplary embodiment of the present invention, the generator further comprises a second circuit adapted for performing an error detection code generation of the second data set, resulting in a third data set (i.e. the message authentication code), wherein the first circuit comprises a first linear feedback shift register, and wherein the first circuit is different from the second circuit.

In other words, the delinearization is obtained by continuously affecting the behaviour the LFSR mixing the plain text (i.e. the first data set) following a non-reusable pseudorandom sequence. Advantageously, according to this exemplary embodiment of the present invention, it is not the LFSR which is used for computation of the error detection code, but the error detection code is computed by a different second circuit.

According to another exemplary embodiment of the present invention, the first circuit comprises at least one lower weight stage and at least one higher weight stage, wherein the delinearization of the first data set comprises a generation of arbitrarily delayed mixed copies of the first data set that are xor-ed against the first data set. Furthermore, the at least one lower weight stage is adapted to ensure that an effect of each bit of the first data set propagate through all subsequent states of the first circuit and the at least one higher weight stage is jammed following a pseudorandom number sequence, wherein the pseudorandom number sequence generates logic arbitrarily delayed subsequences of a state of the at least one lower weight stage.

In this manner, while all the plain text bits affect the error detection code computation, most of them also affect it at delayed random positions that are impossible to guess by the adversary.

According to another exemplary embodiment of the present invention, the generator further comprises a fourth circuit comprising a pseudorandom number generating engine adapted for performing a pseudorandom number generation, wherein the fourth circuit is adapted for providing the generated pseudorandom number to the first circuit.

Thus, advantageously, an externally generated pseudorandom number may be used by the first circuit for the delinearization of the plain text or original code. Advantageously, this pseudonumber generation may be performed by a circuit different to the mixing or delinearization circuit.

According to other exemplary embodiments of the present invention, the pseudorandom number generating engine is selected from the group consisting of a combination of at least one second linear feedback shift register and/or a block cipher operated in a counter mode. Furthermore, an initial state of the combination of the at least one second linear feedback shift register may be chosen at random and may not be reused to generate message authentication codes for more than one message, wherein the initial state is used for performing the pseudorandom number generation.

Advantageously, according to this exemplary embodiment of the present invention, it may possible to let the "keying LFSR" run continuously, that is, using the final state of the LFSR achieved when processing message (i) into the initial state of the processing of the message (i+1).

Furthermore, according to another exemplary embodiment of the present invention, the second circuit comprises a cyclic redundancy check circuit, wherein the generation of the error detection code is based on a cyclic redundancy check construction performed by the second circuit.

Advantageously, the cyclic redundancy check construction is very efficient in computing error detection codes, moreover, it can be very efficiently implemented in hardware. Indeed, it is the circuit of choice for error detection codes in high speed networking equipments such as those used in 1Gps Ethernet. Moreover, the cyclic redundancy check construction is easily scalable to generate codes of different sizes (i.e. error detection strengths).

According to another exemplary embodiment of the present invention, the first data set is padded with at least one of a suffix and a prefix before performing the delinearization.

Advantageously, thus an attack may be avoided, which focuses on changing the last bit (s) of the plain text and computing the corresponding cipher text, assuming no jam occurred in the last phases.

According to another exemplary embodiment of the present invention, a method of generating a message authentication code is disclosed, the method comprising the step of performing a delinearization of a first data set by a first circuit, resulting in a second data set, wherein the first data set comprises an original code, and wherein the delinearization is based on a linear feedback shift register construction.

Advantageously, this may provide for a fast, hardware optimized MAC generation, using less hardware resources and less computational or electrical power.

The present invention also relates to a computer-readable medium and a program element of generating a message authentication code, which is stored on the computer-readable medium. The program element is adapted to carry out the step of performing a delinearization of a first data set by a first circuit, resulting in a second data set, when being executed by a processor. The program element may be part of, for example, an always-on stand alone medical device or an ultra-high speed router that operates in an internet backbone. The program element, according to an exemplary embodiment of the present invention, may preferably be loaded into working memories of a data processor. The data processor may thus be equipped to carry out exemplary embodiments of the methods of the present invention. The computer program may be written in any suitable programming language, such as, for example, Cow and may be stored on a computer-readable medium, such as a CD-ROM. Also, the computer program may be available from a network, such as the World-WideWeb, from which it may be downloaded into processors, or any suitable computers.

Further exemplary embodiments of the present invention are set forth in the sub-claims.

An aspect of the present invention may be that the generator for generating a message authentication code is based on linear feedback shift registers which are adapted to produce secure MACs by performing a delinearization procedure of the original code.

The above and other aspects of the present invention will become readily apparent from and elucidated with reference to the embodiments described hereinafter.

Exemplary embodiments of the present invention will be described in the following, with reference to the following drawings.

Figure 9:
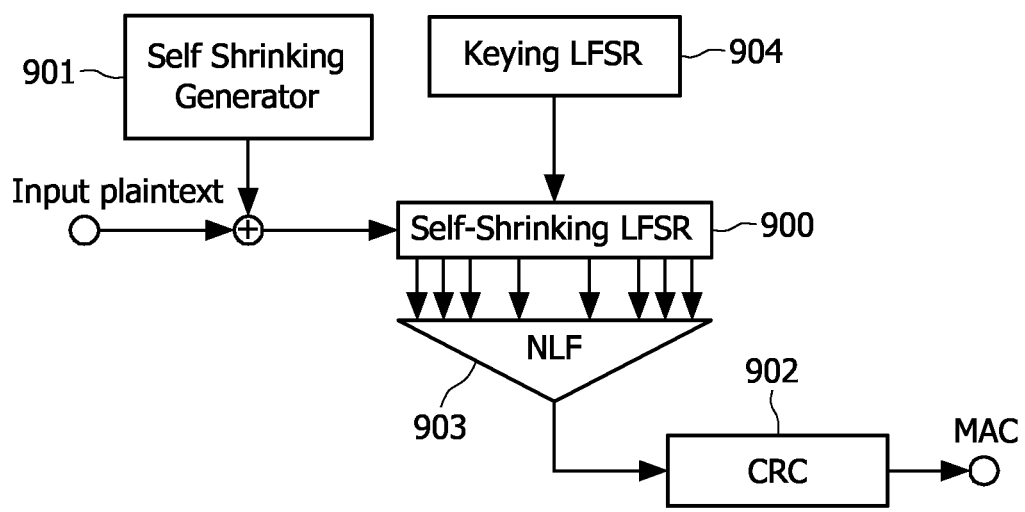

FIG. 9 shows a SN-MAC according to an exemplary embodiment of the present invention. In particular, the plain text is pre-processed before been feed into the mixing engine formed by the block 900 by xoring it with pseudorandom number sequence generated by circuit 901. Finally, the self-shrinking LFSR 900 output is generated by a non-linear function circuit 903 before being processed by CRC circuit 902.

The illustration in the drawings is schematically. In different drawings, similar or identical elements are provided with the same reference numerals.

Figure 1:
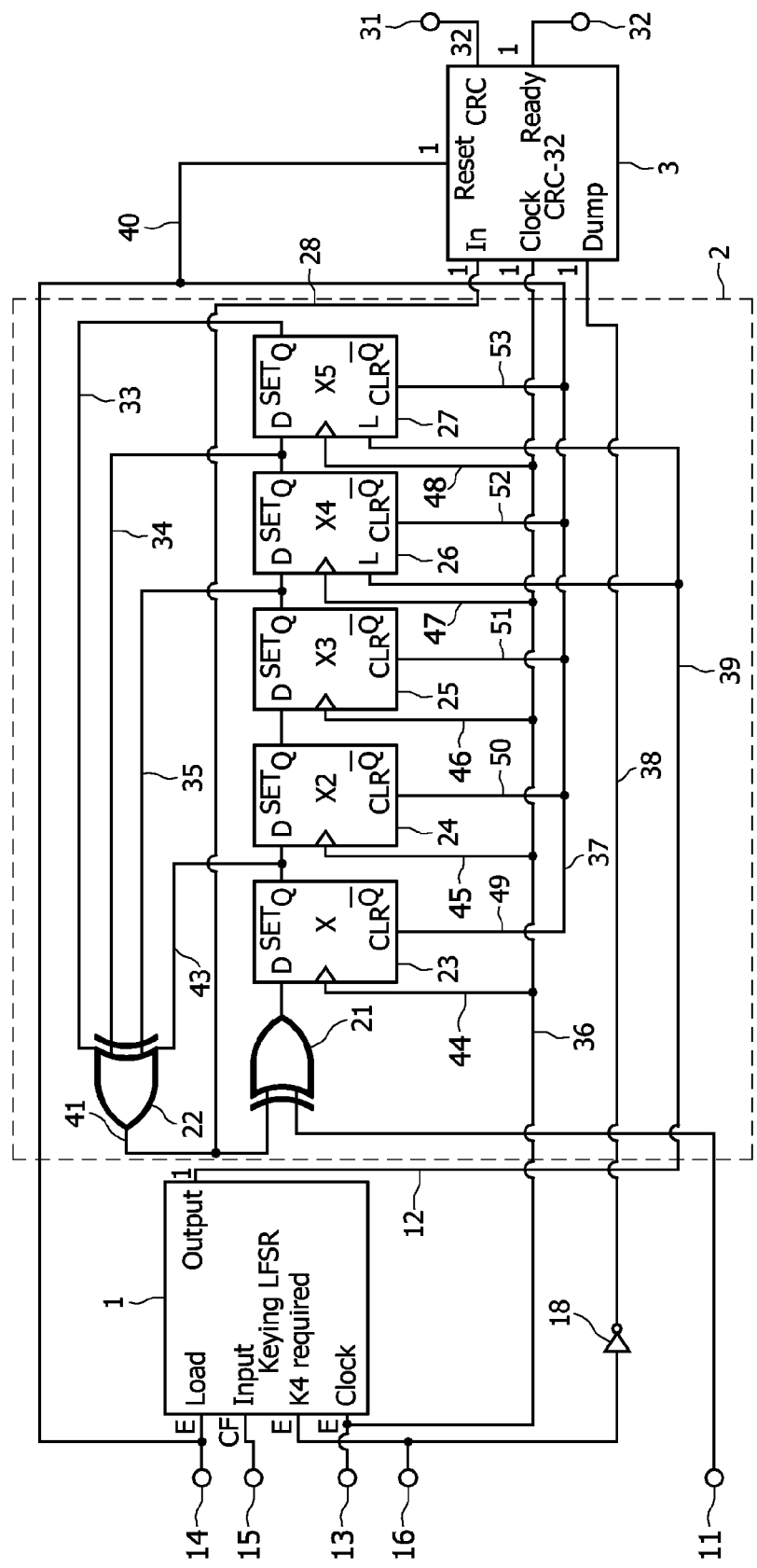
FIG. 1 shows a schematic representation of a SN-MAC generator according to an exemplary embodiment of the present invention.

FIG. 1 shows a schematic representation of a SN-MAC generator according to an exemplary embodiment of the present invention. According to the embodiment depicted in FIG. 1, the MAC generator comprises three major operational groups, namely a pseudorandom number generator group 1, which is implemented by the "key LFSR" block. Furthermore, the generator comprises a central plain text mixer group 2, which is implemented with a five-stage LFSR (a load-controlled flip-flop LFSR) 23, 24, 25, 26, 27, polynomial generating xor 22, 41, 33, 34, 35, 43 and plain text mixing xor 21. (As a third major operational group, the generator comprises a checksum generation block 3, which is implemented with the CRC-32 block executing the standard CRC-32 procedure.

It should be noted, that, according to an aspect of the present invention, a generator does not include the last CRC stage 3, but only circuits 1 and 2.

The pseudorandom number generator group 1 comprises a load input 14, an initial input 15, a clock 13, new bit input 16 and bit output 12, which is fed into LFSR stages 26 and 27.

The clock signals 13 are fed into the pseudorandom number generator group 1 and into each of the five LFSR stages 23-27 via lines 44, 45, 46, 47, 48.

The new bit 16 is provided to the pseudorandom number generator group 1 and to the checksum generation block 3 via element 18.

The load input 14 is further provided to the five LFSR stages 23-27 via lines 49-53, respectively.

The checksum generation block 3 further comprises a secure CRC output 31 and a ready pin 32.

Not gate 18 helps in establishing the correct operating mode between processing input plain text 11 and generating output MAC 31.

Xor gate 21 introduced the plaintext 11 into the LFSR state after computing polynomial result 41

While the CRC-32 algorithm is well suited to detect random changes on the plain text, including error-bursts up to 32 bits and all error burst affecting an odd number of bits (assuming that the CRC-32 polynomial defined in IEEE 802 is used $(X^{32}+X^{26}+X^{23}+X^{22}+X^{16}+X^{12}+X^{11}+X^{10}+X^{8}+X^{7}+X^{5}+X^{4}+X^{2}+X^{1}+1)$, as disclosed in A. S. Tanenbaum, Computer Networks, $4^{th}$ Edition, which is hereby incorporated by reference), it is definitively not able to prevent from undetected deliberate modifications of the plaintext. However, this well-known algorithm may be leveraged into generating secure MACs by re-mixing the plain text 11 into an internal stream in such a manner that it may be unfeasible for the attacker to guess the contents of this internal stream without knowing a secret value (i.e. the key). This stream is labeled "Secret Stream" 28 in FIG. 1.

The mixing bloc, which outputs the "Secret Stream" 28, works by generating arbitrarily delayed mixed copies of the plain text 11 that are xor-ed against the plain text 11 itself as this is imputed into the mixing bloc 2. The Mixing Engine 2 comprises two main sub-components:

The lower weight stages of the mixing LFSR insure that the effect of each bit of the plain text 11 propagates through all the subsequent states of the Mixing Engine 2. Note that in isolation, these stages form the max length LFSR (with primitive polynomial $X^3+X+1$ for FIG. 1).

The higher weight stages that are "jammed" following a pseudorandom sequence, which generates logic randomly-delayed subsequences of the state of the lower weight stages of the LFSR, and by extension, of the plain text 11 itself.

In this manner, while all the plain text bits affect the CRC-32 computation, most of them also affect it at delayed random positions that are impossible to guess by the adversary.

It should be noted, that the connection polynomial shown in FIG. 1 it is not the only possible choice, indeed any primitive connection polynomial that has another primitive polynomial for initial stages may be used (using a non primitive sub-polynomial may be also secure). Furthermore, while a five-stage-only Mixing Engine 2 is depicted in FIG. 1, more or fewer stages may be implemented according to the present invention.

Finally, the "Keying LFSR" bloc 1 may be a standard LFSR with a primitive polynomial and it may have the role of clocking the higher weight stages of the mixing bloc 2 with its output stream 12.

It should be noted that FIG. 1 shows a loading control instead of clock controlling; however, these are equivalent from the algorithmic point of view while the former may be easy to implement in hardware. The initial state of the "Keying LFSR" is the MAC key and the single part of the scheme that should be kept secret. 64 bits may be the minimal LFSR length that would produce a secure 32-bit MAC. Longer lengths are of course permitted and would be required if the CRC stage produced more than 32 bits. Of course, also smaller lengths are possible and within the scope of the present invention.

Obviously, to be secure the initial state of the clock-generating LFSR should be chosen at random and should not be reused to generate MACs for more than one message (i.e. a secret nonce). However, it is possible to let the "Keying LFSR" run continuously, that is, using the final state of the LFSR achieved when processing message(i) into the initial state of the processing of message(i+1).

When relaunching the engine, both the Mixing and the CRC-32 blocs should be cleared (this may be necessary to achieve pre-image resistance).

The first bits of the plaintext message may have only a small chance of being affected by the Mixing Engine and therefore may become easy targets for undetected message modification. To prevent this from happening, it may be necessary to prefix the message with some extra amount of bits. This padding should not be secret and may be a fixed algorithm parameter. Any sequence larger than the Mixing Engine-size with a balanced mix of zeros and ones may be sufficient. For a five-stage Mixing Engine-size the sequence represented by the byte AAhex may be used.

Finally, the latest bits of the plaintext message have only a small chance of affecting the Mixing Engine state in an unpredictable way and therefore can become easy targets for undetected message modification. To prevent this from happening, it may be advantageous to pad the message with some extra amount of bits. This padding should not be secret and can be a fixed algorithm parameter. Any sequence equal or larger than the CRC output stage would do. Therefore, for a 16-bit CRC a sequence of 16 zero bits may be used.

Figure 2:
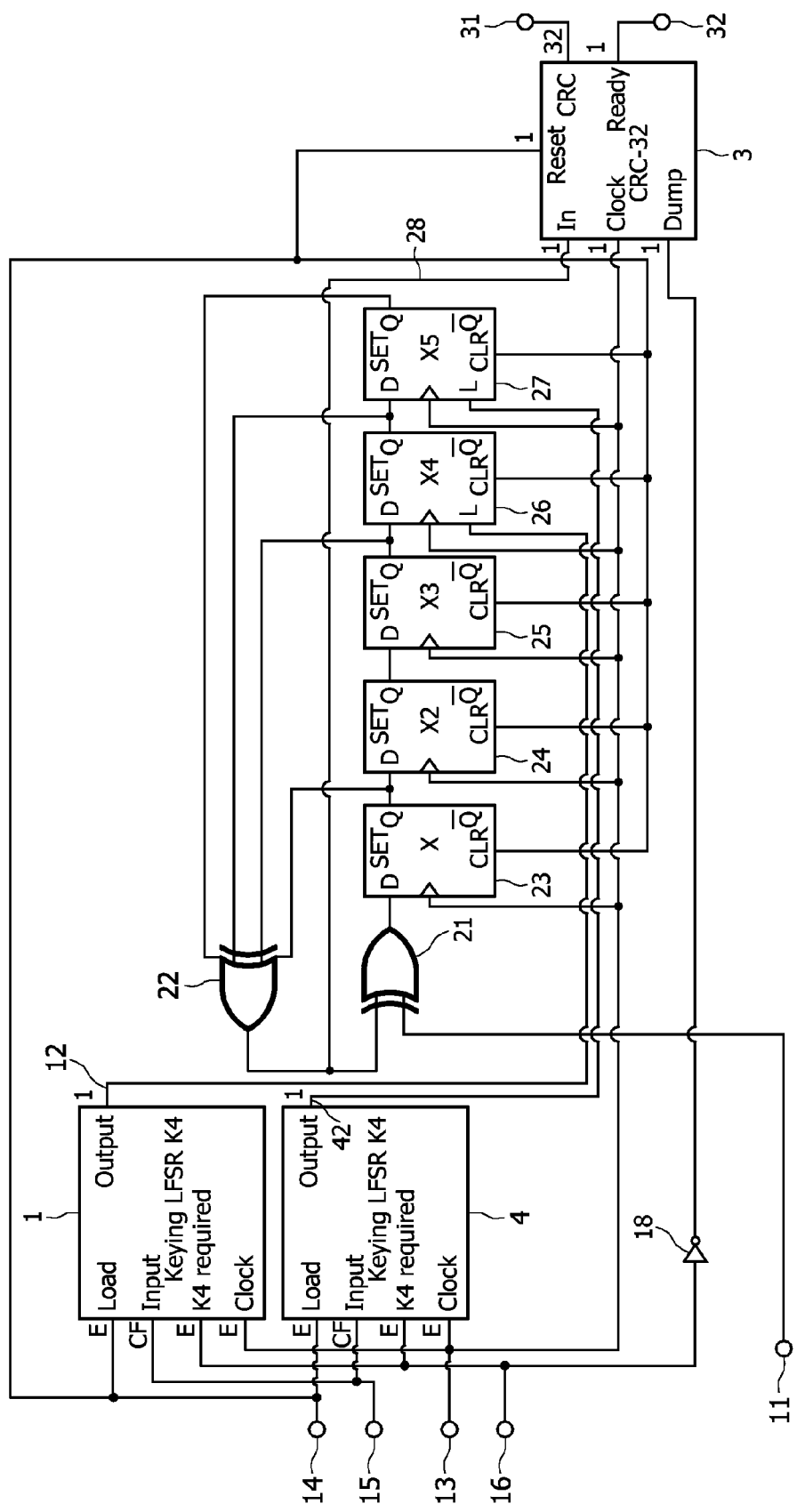
FIG. 2 shows a schematic representation of another SN-MAC generator according to another exemplary embodiment of the present invention.

FIG. 2 shows a schematic representation of another SN-MAC generator according to another exemplary embodiment of the present invention which comprises a second pseudo-random generator 4 and a further random output stream 42.

FIG. 2 depicts an even more secure embodiment of the generator according to the present invention, which requires only a relatively small amount of added hardware. FIG. 2 is a representation of this alternative construction.

In this version of the algorithm, the clock of each randomized stage of the Mixing bloc is controlled by a different pseudorandom number generator LFSR.

The LFSR lengths may be co-prime and may be of lengths 61 and 67 for a CRC-32 based output. In this configuration, the MAC key may be 128 bits long.

The same baseline requirements for secure operation as described above apply.

Figure 3:
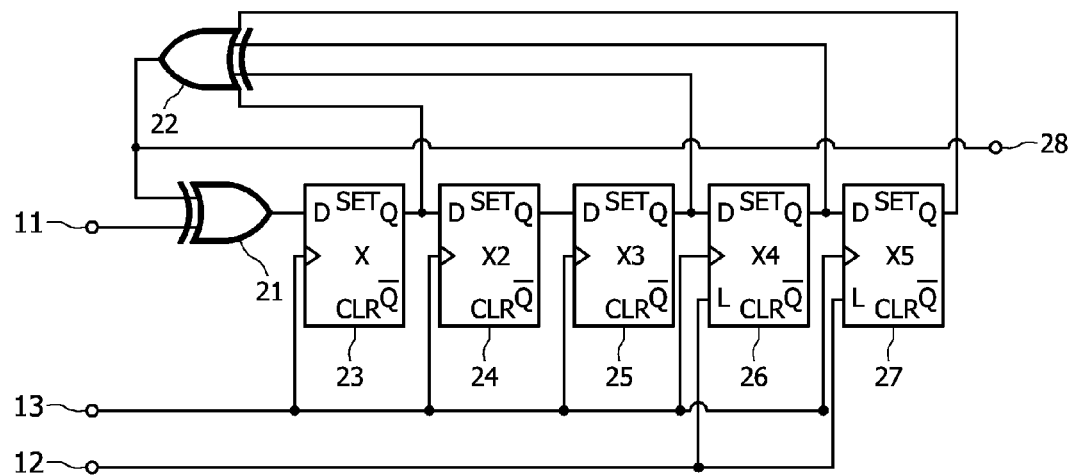
FIG. 3 shows a schematic representation of a keyed plain text mixing engine with loadable flip-flops according to an exemplary embodiment of the present invention.

FIG. 3 shows a schematic representation of a keyed plain text mixing engine with loadable flip-flops according to an exemplary embodiment of the present invention.

Figure 4:
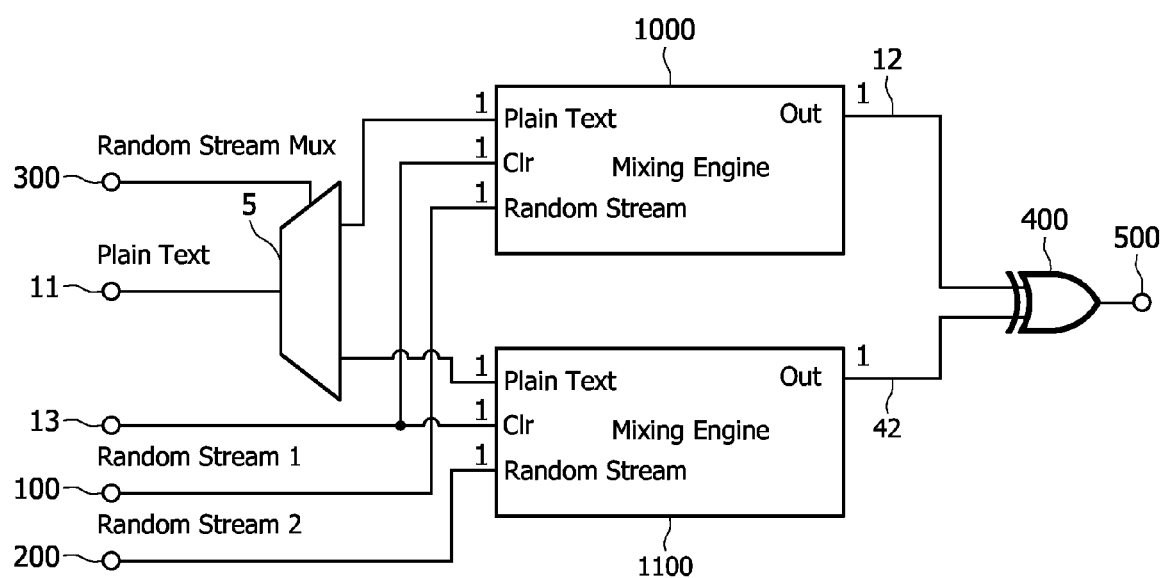
FIG. 4 shows a schematic representation of a mixing engine according to another exemplary embodiment of the present invention.

Given FIG. 3 as an isolated Mixing Engine basic bloc, it may be possible to construct alternative, and probably more secure, variations of it by composing this basic bloc into more complex constructions as depicted in the example of FIG. 4.

FIG. 4 shows a schematic representation of a mixing engine according to another exemplary embodiment of the present invention.

It should be noted, that the embodiments presented above are highly customisable. Indeed, a generalization of this invention to the constructions described below may be performed.

As may be seen from FIG. 3, an engine that given a random stream 12 and a plain text stream 11 produces a third stream 28 which is a state-full non-linear function of the plaintext stream 11.

According to exemplary embodiments of the present invention, the generator may comprise:

An arbitrarily number of stages, and/or an arbitrary number of input Random Streams driving the MSB stages that have correspondent exponent in the LFSR's characteristic polynomial set to 1, and/or an output extracted from the input of the first flip stage instead of what is presented in FIG. 3, and consolidating the LFSR XOR with the plaintext input XOR, and/or an output computed as a (non-) linear combining function of the output of all the LFSR stages, in particular using resilient functions (P. Camion and A. Canteaut. Correlation-immune and resilient functions over a finite alphabet and their applications in cryptography. Designs, Codes and Cryptography, (16):121-149, 1999, which is hereby incorporated by reference), and/or any kind of characteristic polynomial, and/or additional clear and/or set signals, and/or additional parallel loading and/or reading of LFSR, and/or compositions of the mixing engine where the plain text 11 is distributed through several mixing engines 1000, 1100, this controlled by secondary input random streams 100, 200, 300, as depicted in FIG. 4. The secondary input random streams 100, 200, 300 may all come from independent keying LFSRs.

Note that when the aforementioned non-linear combining function is used, it MAY be possible to reuse the pseudo-random keying stream. In this case the delinearization is not directly performed by the mixing engine (or combinations thereof) but uniquely by the non-linear combining function. This has the advantage of significantly simplifying key management of the MAC function when multiple asynchronous messages are interchanged between parties.

In FIG. 4, the final output of the complete non-linar plain text mixing circuit 500 is the xor 400 of the output each mixing engine 12, 42. Note that xor 400 output mixing function could be substituted by any other Boolean function and/or the aforementioned resilient functions.

The stage(s) "Keying LFSR" may be substituted by any pseudo-random generating engine, in particular by any block cipher operated in counter and/or output feedback modes or any combination of LFSRs.

Furthermore, the output stage "CRC-32" may be substituted by any bloc capable of generating an error-detecting code, in particular by any error-detecting code, in particular CRCs of any length and checksums, by cryptographic MDC functions such as SHA-1 and RIPEMD-160, or by congruence generators, or by hash functions commonly used for efficient indexing of data or by the circuit described hereafter:

Take the final state of the mixing engine and use it as initial state of a self-shrinking generator LFSR.

Run the self-shrinking generator LFSR until MAC output of the desired size is obtained.

In the following, further information about the LFSRs and CLCs is provided:

In the following, further information about linear feedback shift registers, linear finite state machines, cyclic redundancy codes, self-shrinking generator and non-linear filter generator is provided.

Now, the main characteristics of linear feedback shift registers (LFSRs) are summarized. Throughout the paper we will consider the binary field F. An LFSR of length n consists of n memory cells, which form together the state $(s_0, s_1, \ldots, s_{n-1})$. We will refer to the memory cells also as D Flip-Flops. An LFSR defines the output sequence $\{s_i\}_{i \geq 0}$, which is defined by the recurrence relation $$s_{k+n} = \sum_{i=0}^{n-1} c_i s_{k+i}, \quad k \geq 0, \text{ or, equivalently} \quad (1)$$

$$\sum_{i=0}^{n} c_i s_{k+i} = 0, \quad k \geq 0,$$

where $c_n=1$ by definition. Let $s^{(i)}$ define the state of the LFSR at time i, i.e. $s^{(i)}=(s_i, s_{i+1}, \ldots, s_{i+n-1})$.

Then a similar relation for the states holds $$s^{(k+n)} = \sum_{i=0}^{n-1} c_i s^{(k+i)}, \quad k \geq 0, \quad (2)$$

The coefficients $c_i$ are called feedback coefficients, if $c_i=0$ then the corresponding switch is open, while if $c_i=1$ this switch is closed. We will always assume $c_0=1$, because otherwise the output sequence is just a delayed version of a sequence with $c_0=1$.

As usual let associate with an LFSR the so-called characteristic polynomial $f(x)$ defined by:

$$f(x) = c_o + c_1 x + c_2 x^2 + \ldots + c_{n-1} x^{n-1} + x^n = \sum_{i=0}^{n} c_i x^i, \quad (3)$$

where $c_n=1$ by definition and $c_0=1$ by assumption. The reciprocal polynomial of $f(x)$ is defined by:

$$f^*(x) = x^n f\left(\frac{1}{x}\right) = c_0 x^n + c_1 x^{n-1} + \ldots + c_{n-1} x + c_n. \quad (4)$$

With a sequence $\{s_i\}_{i \geq 0}$ we associate the power series $$S(x) = \sum_{i=0}^{\infty} s_i x^i.$$

It is known that S(x) is uniquely determined by $s_0, s_1, \ldots, s_{n-1}$, and $f(x)$, which dependency we state now explicitly $$S(x) = \frac{\tau(x)}{f^*(x)}, \text{ where } \tau(x) = \sum_{j=0}^{n-1} \left(\sum_{l=0}^{j} c_{n-l} s_{j-l}\right) x^j \quad (5)$$

A polynomial $g(x) \in F[x]$ is said to be irreducible over F if it can not be factored into polynomials of smaller positive degrees in the ring of polynomials F[x]. Note that no linear recursion can iterate through all $2^n$ states, since the zero state is forbidden. On the other hand when we start with a non-zero state and a recurrence iterates through all $2^n-1$ non-zero states such an LFSR (sequence) is called maximum-length LFSR (sequence), and the corresponding characteristic polynomial is said to be primitive. Then the period T of such maximum length sequence is $T=2^n-1$. Note that every primitive polynomial is irreducible.

The linear complexity of a sequence, denoted by L, is the length of the shortest LFSR that generates the sequence. The linear complexity may be determined with the Berlekamp-Massey algorithm, as disclosed in "J. Massey. Shiftregister synthesis and BCH decoding, IEEE Thrans. on Inform. Theory 15 (24), 1969, pp. 122-127", which is hereby incorporated by reference, which efficiently computes the characteristic polynomial given at least 2L of output symbols. Thus a pure LFSR is not good keystream generator. As an example we can take an LFSR of length n, which produces a maximal-length sequence of length $2^n-1$, but the Berlekamp-Massey algorithm needs only 2n consecutive bits in a known-plaintext attack to fully determine the feedback polynomial and the initial state and thus the complete sequence.

An n-bit linear finite state machine (LFSM) is a realization or an implementation of a certain linear operator given by an n×n matrix M. The internal state of the LFSM is described by an n-bit vector $v \in F^n$. The evolution over the time is described by a sequence of n-bit vectors $v^{(i)}=(v_0^{(i)}, v_1^{(i)}, v_{n-1}^{(i)})$, $i \geq 0$, satisfying $$v^{(i+1)}=Mv^{(i)}. \quad (6)$$

Here, $v^{(0)}$ is the initial state. The characteristic polynomial of a matrix M with entries in the binary field F is defined to be the polynomial $$\text{char}(M)=\det(xI-M) \in F[x], \quad (7)$$

where as usual I denotes the n×n identity matrix. It is well known that if the characteristic polynomial of M is primitive over F, then each of the sequences $\{v_j^{(i)}\}_{i \geq 0}$ (for j=0, 1, ..., n−1) has period $2^n−1$. Let define the companion matrix of a polynomial $f(x)$ given by (3) to be the matrix $$L = \begin{pmatrix} 0 & 1 & 0 & 0 & \ldots & & \ldots & 0 & 0 \\ 0 & 0 & 1 & 0 & \ldots & & \ldots & 0 & 0 \\ 0 & 0 & 0 & 1 & \ldots & & \ldots & 0 & 0 \\ \vdots & & & & \ddots & & & & \vdots \\ 0 & 0 & & & \ldots & 1 & 0 & 0 & \ldots & 0 & 0 \\ 0 & 0 & & & \ldots & 0 & 1 & 0 & \ldots & 0 & 0 \\ 0 & 0 & & & \ldots & 0 & 0 & 1 & \ldots & 0 & 0 \\ \vdots & & & & & & & \ddots & & & \vdots \\ 0 & 0 & 0 & & \ldots & & & \ldots & \ldots & 1 & 0 \\ 0 & 0 & 0 & & \ldots & & & \ldots & \ldots & 0 & 1 \\ c_0 & c_1 & c_2 & \ldots & & & & \ldots & \ldots & c_{n-2} & c_{n-1} \end{pmatrix} \quad (8)$$

The most popular subclasses of the LFSM's are LFSR's and cellular automata (CA). A CA is an LFSM with a defining matrix M which is tridiagonal. An LFSR with a characteristic polynomial $f(x)$ given by (3) is an LFSM with defining matrix set to the companion matrix off $f(x)$ given by (8). The following fact is well known.

Theorem 1. Let $f(x)$ be the characteristic polynomial of a square matrix M. Denote by L, the companion matrix of $f(x)$. If $f(x)$ is irreducible, then there exists an invertible matrix T satisfying $TMT^{-1}=L$.

The matrix T appearing in this theorem is not unique. Theorem 1 may be used to reduce an LFSM to an LFSR. Recall that the evolution of LFSM internal state is given by (6), if the initial state of the LFSM is $v^{(0)}$ then the state $v^{(i)}$ will be given by $v^{(i)}=M^i v^{(0)}$ Similarly, if the initial state of the LFSR defined by $f(x)$ (matrix L) was $s^{(0)}$, the state $s^{(i)}$ will be given by $s^{(i)}=L^i s^{(0)}$.

Now, if the initial states satisfy the relation $s^{(0)}=Tv^{(0)}$ then (by Theorem 1) the current state $v^{(i)}$ of the LFSM may be calculated using the internal state $s^{(i)}$ of the associated LFSR through the simple linear equation $v^{(i)}=T^{-1}s^{(i)}$.

So, even an LFSM seems much more complicated than an LFSR, the two are apart by a simple linear transformation.

Let g(x) be an irreducible polynomial of degree s. In what follows we will explicitly or implicitly associate each binary string S with the polynomial S(x) over F with coefficients corresponding to the bits of S. Let B be a message of length m, thus B(x) is the corresponding polynomial of degree m. Then the CRC value (based on g(x)) may be defined as a polynomial C(x) of degree s−1 satisfying the relation $C(x)=x^s B(x) \bmod g(x)$, \quad (9)

i.e. $x^s B(x)+C(x)$ is divisible by g(x). It is easy to derive the following lemma.

Lemma 1. With the notations above for given polynomials g(x) and C(x) there are $2^{m-s}$ polynomials B(x) satisfying (9).

In "D. Coppersmith, H. Krawczyk, Y. Mansour. The shrinking generator, CRYPTO'93, LNCS 773, 1993, pp. 22-39", which is hereby incorporated by reference, concep- tual simple keystream generator the so-called shrinking generator is proposed. It combines only two LFSRs: one of them controls the output of the other, and thus the output keystream is an irregularly decimated subsequence of a maximal-length sequence. A year later even more elegant construction—self-shrinking generator were presented by Meier and Staffelbach in "W. Meier, O. Staffelbach. The self-shrinking generator, EUROCRYPT'94, LNCS 905, 1994, pp. 205-214". In fact, the two LFSRs from the shrinking generator are combined into one LFSR, which output a sequence divided into pairs of bits. The selection bit, usually the first one, determines if the other bit, the active bit, is to be taken to output keystream or to be discarded. As pointed out by Meier and Staffelbach, the self-shrinking generator is equivalent in functionality to the shrinking generator. Notice that from the selection logic of the self-shrinking generator, on average, 3 out of 4 bits produced by the LFSR are discarded, while for the shrinking generator, on average, 1 out of 2 bits are discarded. The period T of the self-shrinking generator satisfies $2^{[n/2]} \leq T \leq 2^{n-1}$, but the experimental results indicate that the period always takes the maximum possible value. It was also shown that the linear complexity satisfies $T/2 \leq L \leq 2^{n-1}-(n-2)$ (see "S. Blackburn. The linear complexity of the self-shrinking generator, IEEE Trans. on Inform. Theory, 45 (6), 1999, pp. 2073-2077"). Hence, if $T=2^{n-1}$ then $L=O(2^{n-1})$.

Cryptanalysis of the self-shrinking generator often assumes known feedback polynomial. The computational complexity of the attack may vary from $O(2^{0.5n})$ Up to $O(2^{0.75n})$ using long $O(2^{0.5n})$ observed keystream. Also, an attack with computational complexity $O(2^{0.69n})$, but using very short length of observed keystream, has bee proposed in "E. Zenner, M. Krause, S. Lucks. Improved cryptanalysis of the self-shrinking generator, ACISP'01, LNCS 2119, 2001, pp. 21-35". The latter attack was improved in "H. Krawczyk. LFSR-based Hashing and Authentication, CRYPTO'94, LNCS 839, 1994, pp. 129-139" reducing the complexity to $O(2^{0.64n})$, again using very short length of observed keystream sequence. For a certain classes of weak (sparse) feedback polynomials even more efficient attacks may exist.

A non-linear filter generator consists of a single LFSR (with length n) and a non-linear function $f(x)$ whose r inputs ($r \leq n$) are taken from some shift register stages to compute the output.

For a Boolean function of algebraic degree k, it is very likely that the linear complexity of the keystream is at least $\binom{n}{k}$ and its period remains equal to $2^n-1$. There are several types of attacks, e.g. (fast) correlation, inversion, algebraic. In order to resist these attacks the Boolean function should be highly non-linear, with high degree, correlation-immune and algebraic-immune.

Building Blocks

Now, several cryptographic primitives based on linear finite state machines, namely continuously fed linear feedback shift registers, jamming linear feedback shift registers, shrinking linear finite state machines and self-shrinking linear feedback shift registers according to exemplary embodiments of the present invention are described.

Let us consider an LFSR of length n and a sequence $$P(x) = \sum_{j=0}^{\infty} p_j x^j = \sum_{j=0}^{\infty} x^{nj} P^{(j)}(x), \quad (10)$$

where $P^{(j)}(x) = p_{nj} + p_{nj+1}x + \ldots + p_{nj+n-1}x^{n-1}$ are polynomials of degree n−1. Denote by $P^{(j)}=(p_{nj},\,p_{nj+1},\,\ldots,\,p_{nj+n-1})$ the corresponding to $P^{(j)}(x)$ n-bit vector. Recall that the internal state of an LFSR defined by characteristic polynomial $f(x)$ (matrix L) is calculated by $s^{(i)}=Ls^{(i-1)}$, where $s^{(0)}=P^{(0)}$. We will further use $P^{(j)}(x)$ as initial states for generating new sequences $S^{(j)}(x)$ with the same LFSR. In other words instead of feeding once the LFSR and producing a sequence $S(x)$ (as described above in "Linear Feedback Shift Registers"), we will feed it periodically. This can be done in the following two ways:

1. Each n-th time frame we feed the LFSR by changing the current state $s^{(nj)} \leftarrow s^{(nj)} + P^{(j)}$ (this is the j-th feeding). In this way the LFSR will produce in each such feeding a new additional sequence (denoted by $S^{(j)}(x)$). Thus the resulting sequence $$S(x) = \sum_{j=0}^{\infty} x^{nj} S^{(j)}(x) \qquad (11)$$

is a shifted sum of the sequences.

2. Every time frame we feed the LFSR by xor-ing the current state with one new value. Let $i=n(j-1)+1$ for some j, now repeat for $k=0,\ldots,n-1$ the following procedure $s^{(i+k)} \leftarrow s^{(i+k)} + (p_{nj+n-1-k},\,0,\,\ldots,\,0)$ and $s^{(i+k+1)} = Ls^{(i+k)}$. As a result the LFSR will produce a new additional sequence, let denote it by $\tilde{S}^{(j-1)}(x)$. But now $\tilde{S}^{(j-1)}(x) = \tilde{P}^{(j-1)}(x) + x^n S'(x)$, where the polynomial $\tilde{P}^{(j)}(x)$ comes from the n feedings and shifts (i.e. $\tilde{P}^{(j)}(x) = c_0 p_{nj+n-1} + (c_0 p_{nj+n-2} + c_1 p_{nj+n-1})x + \ldots + (c_0 p_{nj} + c_1 p_{nj+1} + \ldots + c_{n-1} p_{nj+n-1}) x^{n-1})$ and $S^{(j)}(x)$ is the same sequence as in the previous case, see (11). Thus the resulting sequence now is $$S(x) = \sum_{j=0}^{\infty} x^{nj} \tilde{S}^{(j)}(x). \qquad (12)$$

The difference between (11) and (12) is that in (12) we have added a polynomial to each new sequence.

In both cases the power series $S^{(j)}(x)$ and $\tilde{S}^{(j)}(x)$ are uniquely determined by their initial states $P^{(j)}(x)$ in the same way as defined above in "Linear Feedback Shift Registers". Now we give a formal definition and derive some basic properties.

Definition 1. Let an LFSR and an input sequence $P(x)$ are given. When LFSR produces output sequence $S(x)$ by periodically updating (xor-ing) its internal state with the input sequence we call it continuously fed LFSR.

Lemma 2. Consider a continuously fed LFSR of length n. Let the output sequence $S(x)$ and the LFSR (i.e. $f(x)$ or L) are known. Then in the first case (11) the input sequence $P(x)$ can be efficiently reconstructed, whereas in the second case (12) one needs to know also n consecutive bits of $P(x)$.

Let the output sequence $S(x)$ is known but $f(x)$ is unknown. Then in order to apply Berlekamp-Massey algorithm and to reconstruct the whole input sequence $P(x)$ the attacker needs n consecutive bits of $P(x)$ in the first case (11), while in the second case (12) 2n consecutive bits of $P(x)$ are required.

We start with the following well known definition.

Definition 2. Let a sequence $\{\sigma_i\}_{i \geq 0}$ is given. A D flip-flop (cell) is called 1-bit register if (at time i) the sequence value $\sigma_i = 0$ the previous cell state is repeated and the input is ignored, while if $\sigma_i = 1$ the input replaces the cell state. In both cases the output is the previous cell state.

In other words an 1-bit register works as normal D flip-flop (just as a delay element) except when the corresponding value of the sequence is zero, in which ease we will say that we have a jam. We will call the sequence $\{\sigma_i\}_{i \geq 0}$—the shrinking sequence.

Definition 3. We will call an LFSR jamming if one or more of its cells (D flip-flops) are replaced by 1-bit registers.

Let us consider an LFSR of length n. As usual let the LFSR produces a sequence $\{s_i\}_{i \geq 0}$ Now let fix the l-th ($l \leq n$) D flip-flop, i.e. the LFSR cell, which is replaced by an 1-bit register. In order to have an 1-bit register we need a shrinking sequence which will control when the flip-flop cell will be jammed. Assume that the state of the LFSR at time i is $$s^{(i)} = (s_i,\,s_{i+1},\,\ldots,\,s_{i+l-2},\,s_{i+l-1},\,s_{i+l+1},\,\ldots,\,s_{i+n-1})$$

and that the LFSR (its l-th flip-flop) is jammed then the next state of the LFSR at time i+1 will be $$s^{(i+1)} = (s_{i+1},\,s_{i+2},\,\ldots,\,s_{i+l-1},\,s_{i+l},\,s_{i+l},\,s_{i+l+2},\,\ldots,\,s_{i+n})$$

Thus $s^{(i+1)} = L' s^{(i)}$ holds, where the companion matrix L is changed to L' as follows $$L' = \begin{pmatrix} 0 & 1 & 0 & 0 & \ldots & & \ldots & 0 & 0 \\ 0 & 0 & 1 & 0 & \ldots & & \ldots & 0 & 0 \\ 0 & 0 & 0 & 1 & \ldots & & \ldots & 0 & 0 \\ \vdots & & & & \ddots & & & & \vdots \\ 0 & 0 & & \ldots & 1 & 0 & 0 & \ldots & 0 & 0 \\ 0 & 0 & & \ldots & 1 & 0 & 0 & \ldots & 0 & 0 \\ 0 & 0 & & \ldots & 0 & 0 & 1 & \ldots & 0 & 0 \\ \vdots & & & & & & & \ddots & & \vdots \\ 0 & 0 & 0 & & \ldots & & \ldots & \ldots & 1 & 0 \\ 0 & 0 & 0 & & \ldots & & \ldots & \ldots & 0 & 1 \\ c_0 & c_1 & c_2 & \ldots & & & \ldots & \ldots & c_{n-2} & c_{n-1} \end{pmatrix} \qquad (13)$$

Hence every jam of the cell generates a new sequence, which gives the difference that this jam introduces, compared with the normal state (without a jam). Assume that the normal sequence is computed as follows:

$$s_{i+n+1} = c_0 s_{i+1} + c_1 s_{i+2} + \ldots + c_{l-1} s_{i+l} + c_l s_{i+l+1} + \ldots + c_{n-1} s_{i+n},\text{ which is changed to}$$

$$\tilde{s}_{i+n+1} = c_0 s_{i+1} + c_1 s_{i+2} + \ldots + c_{l-1} s_{i+l} + c_l s_{i+l} + \ldots + c_{n-1} s_{i+n},\text{ when the l-th flip-flop is jammed, thus}$$

$$\tilde{s}_{i+n+1} = c_1 s_{i+n+1} + c_l(s_{i+l} + s_{i+l+1})\text{ is their difference.}$$

Hence the new additional sequence has the following initial state $\tilde{s} = (0,\ldots,0,\,S_{i+l}+s_{i+l+1},\,0,\ldots,0)$. The conclusion is that every jam generates a new sequence $S^{jam(i)}(x)$ (shifted to the time when a jam occurs). Thus the output of the LFSR becomes $S(x) + x^i S^{jam(i)}(x)$ if the jam occur at time i. As a consequence we have an output of the jamming LFSR computed from its initial state and depending on the shrinking sequence. Thus the output sequence of the jamming LFSR will have the form $$S(x) + \sum_i x^i S^{jam(i)}(x), \qquad (14)$$

where i and hence the initial states of $S^{jam(i)}(x)$ depend on the shrinking sequence $\{\sigma_i\}_{i \geq 0}$. Recall that a jam at time i occur (i.e. $S^{jam(i)}(x)$ exists) if and only if $\sigma_i = 0$.

Considering the internal state sequence $\{s^{(i)}\}_{i\geq 0}$ of the jamming LFSR and taking into account (8) and (13) we notice that $$s^{(i+1)} = \begin{cases} L's^{(i)}, & \text{if } \sigma_i = 0 \\ Ls^{(i)}, & \text{if } \sigma_i = 1. \end{cases} \quad (15)$$

The way internal state is changed (15) leads to a generalization, which will be presented in the following.

We start with the formal definition of shrinking LFSMs.

Definition 4. Assume we have a shrinking sequence $\{\sigma_i\}_{i\geq 0}$. Let the internal state has length n. Consider two LFSMs with n×n matrices M and M' correspondingly, with primitive characteristic polynomials. We call the LFSMs shrinking if they have common internal state and the next state is computed by applying one of the LFSMs depending on the shrinking sequence. By replacing LFSMs with LFSRs we obtain shrinking LFSRs.

Figure 7:
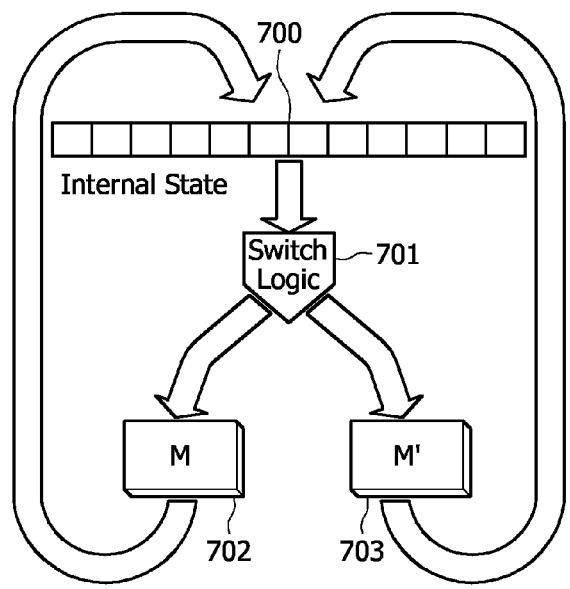
FIG. 7 shows shrinking linear finite state machines (LFSMs) according to an exemplary embodiment of the present invention.

FIG. 7 shows shrinking linear finite state machines (LFSMs) according to an exemplary embodiment of the present invention. A shrinking LFSM comprises a LFSR-like register 700, where the input is not determined by one polynomial but by a one-bit multiplexor 701, 702, 703 using two polynomials. The keying LFSR controls which polynomial is selected.

Let the internal state sequence of the shrinking LFSMs be $\{v^{(i)}\}_{i\geq 0}$ and let the shrinking sequence be $\{\sigma_i\}_{i\geq 0}$, then the following relation holds:

$$v^{(i+1)} = \begin{cases} M'v^{(i)}, & \text{if } \sigma_i = 0 \\ Mv^{(i)}, & \text{if } \sigma_i = 1. \end{cases} \quad (16)$$

Hence $v^{(i+k)} = [M^{i_1} \ldots (M')^{i_3} M^{i_2}(M')^{i_1}]v^{(i)}$, where the sequence $\{\sigma_j\}_{j=1}^{i+k}$ consists of $i_1$ zeroes, following by $i_2$ ones, $i_3$ zeroes, etc. and ending with $i_l$ ones. Based on these relations the following theorem can be proven.

Theorem 2. Let the (secret) shrinking sequence has period $T_D$. Let the shrinking LFSMs have the internal state v with length n. Then each of the output sequences $v_i, 0 \leq i \leq n-1$ of the shrinking LFSMs have period $T = _cT_D$, where c is a constant $1 \leq c \leq 2^n-1$, and linear complexity $L=n\,T_D$.

Proof: Let the shrinking sequence $\{\sigma_j\}_{j=0}^{T_D}$ consists of $i_1$ zeroes, following by $i_2$ ones, $i_3$ zeroes, etc. and ending with $i_l$ ones. Define matrix $M''=M^{i_l} \ldots (M')^{i_3} M^{i_2} (M')^{i_1}$. Then $v^{(i\,T_D)}=(M'')^i v^{(0)}$. Analogous relation can be derived for $V^{(i\,T_D)+j}$ and $v^{(j)}$ (for $0 \leq j \leq T_D$) with corresponding matrix M''. From these relations it follows that the output sequence consists of $T_D$ subsequences which prove the theorem.

It remains an open question which conditions M and M' should satisfy, without any requirements for the shrinking sequence, in order M'' to be of maximum length (i.e. $c=2^n-1$).

Corollary 1. Let the (secret) shrinking sequence $\{\sigma_i\}_{i\geq 0}$ has period $T_D$. An attacker needs $2L=2n\,T_D$ output bits of an shrinking LFSM in order to recover the initial state and the shrinking sequence.

Proof: By applying the Berlekamp-Massey algorithm to each of the sub-sequences with length 2n the attacker can recover the corresponding LFSR producing it. So, he obtains the initial state and using the result from "J. Hong, D. Lee, S. Lee, P. Sarkar. Vulnerability of nonlinear filter generators based on linear finite state machine, FSE'04, LNCS 3017, 2004, pp. 193-209" he also computes the matrix M''. Then going over all $T_D$ sub-sequences he can restore the shrinking sequence.

It is straightforward to generalize the idea of shrinking LFSMs to several (more than 2) LFSMs when using several shrinking sequences to control the way internal state is computed.

Notice that the jamming LFSRs are not shrinking LFSRs. Although we have two LFSRs (LFSMs) defined by the matrices L and L', the second matrix L' is not of maximum-length. Even worse its determinant is zero, hence from some point the sequence becames all zero, which is undesirable. On the other hand a jamming LFSR is like self-shrinking LFSR, i.e. it behaves as two different LFSRs depending on the shrinking sequence. So, here such a self-shrinking LFSR based on the jamming LFSR is constructed, using the simple structure that the jamming LFSRs have. Returning to the definition of L' in equation (13) we notice that depending on the primitive polynomial f(x) (defined by (3)) and on the position of the flip-flop which is replaced by an 1-bit register (i.e. l) the following matrix can be of maximum-length.

$$\tilde{L} = \begin{pmatrix} 0 & 1 & 0 & 0 & \ldots & & \ldots & 0 & 0 \\ 0 & 0 & 1 & 0 & \ldots & & \ldots & 0 & 0 \\ 0 & 0 & 0 & 1 & \ldots & & \ldots & 0 & 0 \\ \vdots & & & & \ddots & & & & \vdots \\ 0 & 0 & & & \ldots & 1 & 0 & 0 & \ldots & 0 & 0 \\ 0 & 0 & & & \ldots & 1 & 1 & 0 & \ldots & 0 & 0 \\ 0 & 0 & & & \ldots & 0 & 0 & 1 & \ldots & 0 & 0 \\ \vdots & & & & & & & \ddots & & \vdots \\ 0 & 0 & 0 & & \ldots & & & \ldots & \ldots & 1 & 0 \\ 0 & 0 & 0 & & \ldots & & & \ldots & \ldots & 0 & 1 \\ c_0 & c_1 & c_2 & \ldots & & & \ldots & \ldots & c_{n-2} & c_{n-1} \end{pmatrix} \quad (17)$$

Note that L' and $\tilde{L}$ differ only in the l-th row where 1 is added in the (l+1)-th column. Now we are ready to define self-shrinking LFSR as follows.

Definition 5. Let a shrinking sequence is given. We call an LFSR, with primitive polynomial $f(x)$ (given by (3)), self-shrinking LFSR when it is considered as shrinking LFSMs with matrices L and $\tilde{L}$ (given by (8) and (17) respectively). This is depicted in FIG. 8.

Figure 8:
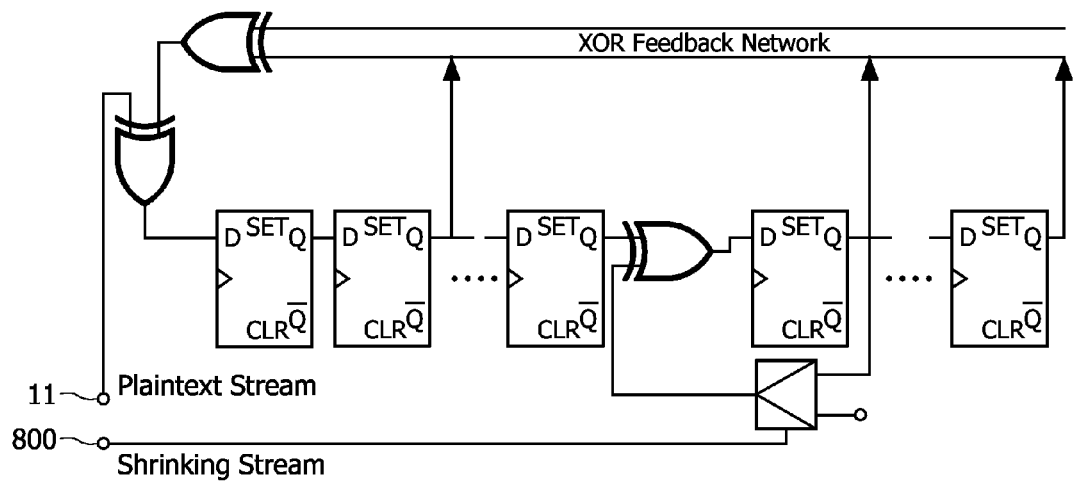
FIG. 8 shows a self-shrinking LFSR according to an exemplary embodiment of the present invention.

FIG. 8 shows a self-shrinking LFSR according to an exemplary embodiment of the present invention, which shows a substitution for the stand alone circuit of FIG. 1 (without the CRC-stage), wherein the shrinking stream 800 is determined by a keying LFSR.

Note that we require both matrices L and L to have primitive characteristic polynomials. Now as a consequence Theorem 2 and Corollary 1 hold for self-shrinking LFSRs too.

A Message Authentication Code

First informal definitions of one-way hash function (OWHF) and collision resistant hash function (CRHF) will be provided. An OWHF is a public function h with argument X of arbitrary length, a fixed length output h(X) and satisfying the following conditions: given h and X it is "easy" to compute h(X), but giving Y in the image of h it is "hard" to find X such that h(X)=Y, and given X and h(X) it is "hard" to find X' such that h(X)=h(X'). A CRHF is a OWHF which additionally is collision resistant, meaning it is "hard" to find two distinct arguments that hash to the same output. Remember that in the case of "ideal security" producing a (second) pre-image requires $2^n$ operations, while producing collision requires $2^{n/2}$ operations (n is the hash length). OWHF and CRHF are also known as weak and strong one-way hash functions.

A MAC is a function h accepting two arguments. The function is publicly known, the first argument X (the text) is publicly known too and can be of arbitrary length, the second argument K (the key) is the only secret and has a fixed length, the output of the function has a fixed length. A MAC should be both one-way function and collision resistant for someone who doesn't know the secret key K. Moreover when the attacker have selected a large set of arguments $\{X_i\}$ and have got the corresponding set of pairs $\{X_i, h(X_i, K)\}$ it must be "hard" to determine the key K or to compute h(X', K) for any X'≠X. The last is known as adaptive chosen plaintext attack. Let denote the length of the key by n and the length of the MAC's tag by s. Recall that a MAC with security parameters n and s should provide resistance to the possible attacks with complexity $0(2^{min(n,s)})$.

A general design of a message authentication code according to an exemplary embodiment of the present invention is disclosed. In contrast to the standard approach based on iteration of a compression function with fixed input size we propose a different way of building MAC which is more suitable for streams.

Let us consider a self-shrinking LFSR of length n, with characteristic primitive polynomial $f(x)$ and companion matrices L and L'. Let also a shrinking sequence $\{\sigma_i\}_{i\geq 0}$ is given. As described above, the output sequence of such self-shrinking LFSR is $$S_3(x) = \tilde{S}_3(x) + \sum_i x^i S_3^{jam(i)}(x), \qquad (18)$$

where $\tilde{S}_3(X)$ is the usual output of the LFSR (without jamming). Recall that $S_3^{jam(i)}(x)$ are uniquely determined by the state of the LFSR at time i. Feed this LFSR continuously as described above in "Continuously Fed LFSR". Let we have the following input sequence (see (10)):

$$S_1(x) = \sum_{i\geq 0} p_i x^i = \sum_{j\geq 0} x^{nj} S_1^{(j)}(x), \qquad (19)$$

where $S_1^{(j)}(x)$ are polynomials of degree n−1. Then as described above in "Continuously Fed LFSR" the 2nd case we obtain the output sequence (see (12)):

$$S_2(x) = \sum_{j\geq 0} x^{nj} S_2^{(j)}(x). \qquad (20)$$

Recall that $S_2^{(j)}(x)$ are uniquely determined by the corresponding initial state $S_1^{(j)}(x)$. Now putting together (18) and (20) we obtain that when fed continuously with a sequence $S_1$, (x) the self-shrinking LFSR generates $$S_4(x) = \sum_{j\geq 0} x^{nj} S_2^{(j)}(x) + \sum_i x^i S_4^{jam(i)}(x), \qquad (21)$$

where $S_2^{(j)}(x)$ are uniquely determined by the corresponding initial state $S_1^{(j)}(x)$ and $S_4^{jam(i)}(x)$ are uniquely determined by the state of the LFSR at time i. Recall that a jam at time i occurs (i.e. $S_4^{jam(i)}(x)$ exists) and only if $\sigma_i=0$, thus (21) can be rewritten also as follows $$S_4(x) = \sum_{j\geq 0} x^{nj} S_2^{(j)}(x) + \sum_{i\geq 0} (\sigma_i + 1) x^i S_4^{jam(i)}(x). \qquad (22)$$

Note that if a continuously fed self-shrinking LFSR is applied with a shrinking sequence to two input sequences say $S'_1(x)$ and $S''_1(x)$ and correspondingly two output sequences (denoted by $S'_4(x)$ and $S''_4(x)$ are produced, then since the computation is linear the output sequence $S'_4(x)+S''_4(x)$ corresponds to the input sequence $S'_1(x)+S''_1(x)$.

Lemma 3. Let the (secret) shrinking sequence $\{\sigma_i\}_{i\geq 0}$ has period $T_D$. Consider a continuously fed selfshrinking LFSR of length n. Denote by P(x) the input sequence and by S(x) the output sequence of this LFSR. Then an attacker needs $2nT_D$ consecutive input bits of P(x) and their corresponding output bits from S(x) in order to recover the shrinking sequence. The knowledge of the shrinking sequence allows him further to compute the whole sequence P(x) from S(x).

Consider a continuously fed self-shrinking LFSR of length n as described above. Let the shrinking sequence be $\{\sigma_i\}_{i\geq 0}$ and the input sequence be $S_1(x)$. Recall that the self-shrinking LFSR has an internal state of length n. Let f be a non-linear function with r≦n inputs. We apply in the standard way (see section "Non-linear Filter Generators" above) the function f to the LFSR's internal state, by taking some of its stages (taps) to be the function inputs. In this way the standard LFSR output $S_4(x)(22)$ is transformed to a new sequence. This transformation we denote as follows $$S_5(X) \leftarrow_f S_4(X). \qquad (23)$$

Note that by applying the non-linear function $f(x)$ we achieve two goals: first, the linear dependance between the input and the output is destroyed and second, the new sequence $S_5(x)$ has the same period as $S_4(x)$ but its linear complexity increases. Denote the algebraic degree of a Boolean function f by deg(f), note that the non-linearity of f imply deg(f)≧2. We emphasize that the function f should also possess several other properties enumerated in section "Non-linear Filter Generators" above. Thus we can improve Lemma 3.

Theorem 3. Let the (secret) shrinking sequence $\{\sigma_i\}_{i\geq 0}$ has period $T_D$. Consider a continuously fed selfshrinking LFSR of length n with non-linear filter function f. Denote by P(x) the input sequence to the LFSR and by S(x) the output sequence produced by f. Then an attacker needs at least $(_{deg(f)}{}^{2nT_D})$ consecutive input bits of P(x) and their corresponding output bits from S(x) in order to recover the shrinking sequence. The knowledge of the shrinking sequence allows him further to compute the whole sequence P(x) from S(x).

FIG. 9 shows a SN-MAC according to an exemplary embodiment of the present invention.

We are ready to present the SN-MAC algorithm, which comprise the following building-blocks, which are depicted in FIG. 9:

Two primitive polynomials $f_3(x)$ and $\tilde{f}_3(x)$ of degree $n_3$ defining the self-shrinking LFSR 900 (i.e. with corresponding companion matrices L and $\tilde{L}$).

A primitive polynomial $f_1(x)$ of degree $n_1$, defining the self-shrinking generator 901 who generates the encryption sequence.

A primitive polynomial $f_2(x)$ of degree $n_2$ defining a LFSR who generates the shrinking sequence $\{\sigma_i\}_{i\geq 0}$ 904.

An irreducible polynomial g(x) of degree s defining the CRC 902.

A non-linear (filter) function $f(x)$ with desired properties 903.

SN-MAC has key with length $n=n_1+n_2$ and produce a tag with length s, i.e. it is a MAC with security parameters n and s. SN-MAC is a general framework for a MAC algorithm instead of fixed construction. Thus we will not fixe any of the parameters of the proposition, allowing the user to chose the most appropriate parameters for his application. The heart of the SN-MAC is a continuously fed self-shrinking LFSR with non-linear filter function (see section "Applying Non-linear Filter to Continuously Fed Self-Shrinking LFSR" above). We will further refer to it as the mixing engine. The SN-MAC algorithm can be described as follows:

1. Let the plaintext be presented as a polynomial P(x) of certain degree. We require the plaintext to have a minimum length $2s-2n_3$.
2. We add a pad to the plaintext as fixed suffix (e.g. zeroes) of length $2_{n_3}$. Denote the padded plain text by PP(x), and let it be a polynomial of degree m.
3. The padded plaintext PP(x) is encrypted by xor-ing it with the encryption sequence generated by the self-shrinking generator. Denote the encrypted text by $S_1(x)$.
4. $S_1(x)$ is the input sequence for the mixing engine (see (19)).
5. The shrinking sequence $\{\sigma_i\}_{i \geq 0}$ for the mixing engine is generated by the LFSR with characteristic primitive polynomial $f_2(x)$.
6. Denote the output sequence of the mixing engine by $S_5(x)$ (see (2)).
7. The last step is to compute the CRC value (based on g(x) from $S_5(x)$. This CRC value of length s is the output of our MAC algorithm, i.e. its tag.

Now some of the design choices according to exemplary embodiments of the present invention are explained. Note that every jam propagates differences till the end of the text, so from the attacker's point of view there is higher probability of success if he changes the last bit(s) of the plaintext. To avoid that kind of attack we require to pad the plaintext with fixed suffix.

Since the padded plaintext PP(x) is a polynomial of degree m, then the corresponding output $S_5(x)$ is also a polynomial of degree m. Recall that for given $S_5(x)$ and g(x) there are $2^{m-s}$ polynomials satisfying (9) see Lemma 1. So, we require the padded plaintext to be with length $m \geq 2s$, in order to have for a given tag at least $2^s$ corresponding different choices (for $S_5(x)$).

Note that the LFSR which produces the shrinking sequence has period $T_D=2^{n_2}-1$, thus from Theorem 3 it follows that the linear complexity of the mixed engine output sequence is at least $O(2n_3(2^{n_2}-1))$. On the other hand the encryption sequence produced by the self-shrinking generator has period $2^{n_1-1}$ and linear complexity $O\ 2^{n_1-1}$. Since both key subsequences (encryption and shrinking) have co-prime periods, the period of the key sequence is $O(2^{n_1-1}(2^{n_2}-1)=O(2^{n-2})$. Moreover an attacker needs at least $$O(2^{n_1-1})O(2_{n_3}(2^{n_2}-1))=O(n_3 2^{n_1+n_2-2}=O(2^{n-2})$$

bits of the corresponding input/output pair (i.e. PP(x)/$S_5$(x)) in order to derive the key, i.e. to break both the mixing engine and the self-shrinking generator. Note that in this calculation we use the result from Lemma 3 instead of the stronger result from Theorem 3.

Since SN-MAC is a stream oriented MAC algorithm we use the same approach as stream ciphers use to change the key when certain amount of information is manipulated. Based on the calculations above we require the current SN-MAC key to be replaced when $2^{n-2}$ bits of information is manipulated. Note that the latter does not imply that only one MAC per key is allowed, instead as stream ciphers work one can encrypt (calculate the MAC tag) several times without resetting the key sequence. We should stress that the information, which is allowed to be manipulated with one key, is equal to the key sequence period and as we have shown it is the minimum amount of information which an attacker needs in order to reveal the key.

The rigorous proof of security for a MAC algorithm is usually obtained for algorithms based on either primitives like block ciphers or dedicated hash functions, or based on universal hashing paradigm. The algorithm we propose is specifically designed for streams, and therefore it does not rely on the standard approach of underlying compression function. Let expand the definitions of OWHF/CRHF to functions which for arbitrary length input compute the output with the same length (instead of fixed length output) and call such functions OWHF/CRHF with arbitrary length. Let present schematically SN-MAC algorithm as follows:

$$F: PP(x) \to S_5(x) \qquad (24)$$

$$G: S_5(x) \to \text{tag}.$$

In other words, consider the SN-MAC but without the last step (the CRC calculation) as a function F which for a given (arbitrary length) input PP(x) calculates an output $S_5(x)$ with the same length. Analogously define the last step as a function G which takes an arbitrary length input and produces a fixed length output. Thus, as we showed function F (with fixed key) is an OWHF with arbitrary length. It is an ongoing work to prove that F is also a CRHF with arbitrary length. An interesting open problem how to choose G, when a CRHF with arbitrary length F is given, in such a way that the composition G o F is a CRHF. We chose G to be an error-detection code in order to achieve this goal.

Thus, according to exemplary embodiments of the present invention, a new design for a message authentication code. SN-MAC is disclosed to provide a sufficient level of security for highly constrained devices and to be used together with stream ciphers. It is a hardware-optimized MAC algorithm for powerless devices. The definition of one-way (collision resistant) hash function has been expanded, to functions with arbitrary length. Also, several new building blocks for symmetric cryptographic schemes, which are of independent interest, are disclosed.

Therefore, the following constructions are disclosed:

A. Stand-alone circuit of FIG. 1 minus the last CRC stage (loadable LFSR with Jams, keyed by another LFSR). The output of this circuit cannot be consumed "as is" but is the fundamental information needed by a complete circuit generating the MAC.

B. Stand-alone circuit of FIG. 1, comprising a CRC-circuit 3.

C. The circuit according to (A), using a hash function as those used to generate efficient lookup tables and routing algorithms.

D. The circuit according to (A) using two keying LFSRs 1, 4 (see FIG. 2).

E. Two circuits 1000, 1100 according to (A) (as depicted in FIG. 4), wherein inputs 300, 100, 200 all come from independent keying LFSRs.

F. A substitution for the circuit according to (A) (as depicted in FIG. 7), implemented by one LFSR-like register 700 where the input is not determined by one polynomial but by a one-bit multiplexor 701, 702, 703 using two polynomials. The keying LFSR controls which polynomial is selected.

G. A substitution for the circuit according to (A), implemented as in FIG. 8, wherein the shrinking stream 800 is determined by a keying LFSR.

H. A full circuit as described in FIG. 9.

I. The circuit as described in FIG. 9 without pseudorandom number generator 901 and associated plain-text enciphering xor.

J. once the plain-text is been all fed to circuit A (or one of its alternatives D, F and G), take the final state of the LFSR in A as the input of the next stage. Use this state as initial state of a SSG (see "Self Shrinking Generator" above) of equal size to circuit A. Run the SSG until obtaining an output of the size of the initial state (e.g. 64 bits output for a 64 bit LFSR). This output is the final MAC.

Figure 5:
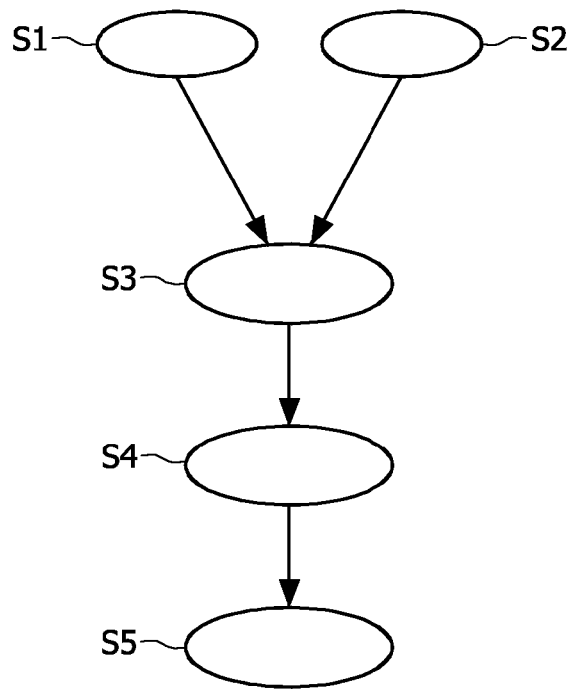
FIG. 5 shows a flow-chart of an exemplary embodiment of a method of generating a method authentication code according to the present invention.

FIG. 5 shows a flow-chart of an exemplary embodiment of a method of generating a message authentication code with a generator according to the present invention. The method starts at step S1 with the acquisition of plain text data which is transmitted to a mixing engine. In step S2, a pseudonumber generation is performed by a pseudorandom number generating engine and the generated pseudonumber is transmitted to the mixing engine. The mixing engine, which may comprise a LFSR, then performs a delinearization based on a linear feedback shift register construction and on the generated pseudonumber in step S3. After that, in step S4, a checksum or error detection code is generated on the basis of the delinearized data set, after which a MAC generation is performed in step S5.

It should be noted, that the delinearization of the plain text data and the pseudonumber generation as well as the computation of the error detection code may be performed by different hardware components.

Figure 6:
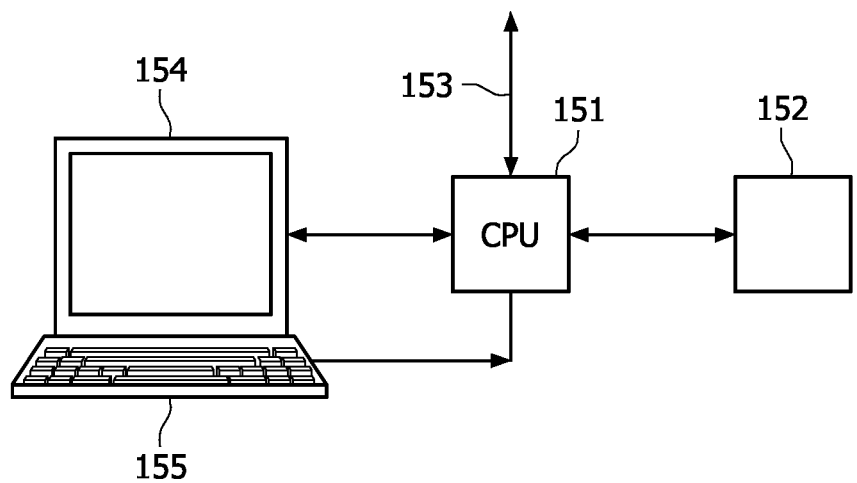
FIG. 6 shows an exemplary embodiment of a processor according to the present invention, for executing an exemplary embodiment of a method in accordance with the present invention.

FIG. 6 depicts an exemplary embodiment of a processing device according to the present invention for executing an exemplary embodiment of the method in accordance with the present invention. The device depicted in FIG. 6 comprises a central processing unit (CPU) 151 connected to a memory 152 for storing a first, second, or third data set. The data processor 151 may be connected to a plurality of input/output network devices, such as a keyboard or a computer tomography apparatus. The data processor 151 may furthermore be connected to a display device 154, for example, a computer monitor, for displaying information or a plain text stored in processor 151. An operator or user may interact with the processor 151 via a keyboard 155 and/or other output devices, which are not depicted in FIG. 6.

Furthermore, via the bus system 153, it may also be possible to connect the processor 151 to, for example, a receiving station, which is adapted for receiving the encoded data stream.

As introduced above, the invention may be readily used to implement tamper-resistant communication in the following generic domains:

Systems that require extremely efficient power management, such as always-on standalone medical devices.

Systems where the maximum communication speed is paramount, such the ultra-high speed routers that operate the Internet backbones.

In addition, the invention may be used to optimise systems that require strong integrity checking of their externally stored state while operate, such as secure microprocessors that store working data in external RAM.

Moreover, the present invention may be advantageously by applied for:

Authentication of Firmware and operating systems in embedded devices;

OMA DRM.

It should be noted that the term "comprising" does not exclude other elements or steps and the "a" or "an" does not exclude a plurality and that a single processor or system may fulfil the functions of several means or units recited in the claims. Also elements described in association with different embodiments may be combined.

It should also be noted, that any reference signs in the claims shall not be construed as limiting the scope of the claims.

The invention claimed is:

1. A generator for generating a message authentication code (MAC), the generator comprising:
   a first circuit that performs a delinearization of a first data set, resulting in a second data set, wherein the first data set comprises a plain text and the first circuit further comprises:
   a first pseudorandom number generator; and
   a central plain text mixer, implemented by a load-controlled first linear feedback shift register (LFSR), that generates arbitrarily delayed mixed copies of the plain text;
   an error detection circuit that detects errors in the second data set, resulting in a third data set; and
   wherein the error detection circuit is implemented by sampling a state of the first circuit using a resilient non-linear function and feeding results from the sampling to perform efficient indexing of data and efficient routing of networking data sets.

2. The generator of claim 1, wherein the first pseudorandom number generator is a second LFSR.

3. The generator of claim 2, wherein an initial state of the second LFSR is chosen at random and is not reused to generate MACs for more then one message, and the initial state is used for performing the pseudorandom number generation.

4. The generator of claim 1, wherein the error detection circuit comprises a cyclic redundancy check (CRC) circuit.

5. The generator of claim 1, wherein the error detection circuit is a cryptographic Modification Detection Code (MDC) function circuit.

6. The generator of claim 1, wherein the error detection circuit provides efficient indexing of data and efficient routing of networking data sets.

7. The generator of claim 1, wherein the error detection circuit is implemented by extracting a final state of the first circuit, using the extracted final state as an initial state of a self-shrinking-generator circuit, and operating the self-shrinking generator circuit until output of desired size is obtained.

8. The generator of claim 1, wherein the error detection circuit is implemented by sampling a state of the first circuit using a resilient non-linear function and feeding results from the sampling to a CRC circuit.

9. The generator of claim 1, wherein, before performing the delinearization, the first data set is padded with at least one of a suffix and a prefix.

10. The generator of claim 1, wherein the first circuit further comprises:
    a second pseudorandom number generator.

11. The generator of claim 10, wherein the first circuit further comprises:
    a third pseudorandom number generator;
    a first mixing engine; and
    a second mixing engine.

12. The generator of claim 1, further comprising:
    a one-bit multiplexer, wherein the first circuit further comprises a FIFO register, the one-bit multiplexer determines an input of the FIFO register by using a first polynomial and a second polynomial, and the first pseudorandom number generator controls a selection of the first polynomial and the second polynomial.

13. The generator of claim 12, wherein the error detection is implemented by extracting a final state of the first circuit, using the extracted final state as an initial state of a self-shrinking-generator circuit, and operating the self-shrinking generator circuit until output of desired size is obtained.

14. The generator of claim 12, wherein the error detection is implemented by sampling a state of the first circuit using a resilient non-linear function and feeding results from the sampling to a CRC circuit.

15. The generator of claim 12, wherein the error detection circuit is implemented by sampling a state of the first circuit using a resilient non-linear function and feeding results from the sampling to perform efficient indexing of data and efficient routing of networking data sets.

16. The generator of claim 1, wherein the first pseudorandom number generator determines a shrinking stream.

17. A generator for generating a message authentication code (MAC), the generator comprising:
  a first circuit that performs a delinearization of a first data set, resulting in a second data set, wherein the first data set comprises a plain text and the first circuit further comprises:
  a first pseudorandom number generator; and
  a central plain text mixer, implemented by a load-controlled first linear feedback shift register (LFSR), that generates arbitrarily delayed mixed copies of the plain text;
  wherein the central plain text mixer further comprises:
  a lower weight stage; and
  a higher weight stage, wherein the delinearization of the first data set further comprises a generation of arbitrarily delayed mixed copies of the first data set that are xor-ed against the first data set, the lower weight stage ensures that an effect of each bit of the first data set propagates through all subsequent states of the central plain text mixer, a pseudorandom number sequence jams the higher weight stage, drives the higher weight stage and generates arbitrarily delayed subsequences of a state of the lower weight stage.

18. A method of generating a message authentication code (MAC), the method comprising:
  generating a first pseudonumber with a first pseudorandom number generator;
  transmitting the generated pseudonumber to a central plain text mixer, wherein the central plain text mixer comprises a load- controlled linear feedback shift register (LFSR);
  performing a delinearization of a first data set at delayed random positions in the central plain text mixer based upon the generated pseudonumber to produce a second data set;
  detecting errors in the second data set using an error detection circuit, resulting in a third data set; and
  wherein the error detection circuit is implemented by sampling a state of the first circuit using a resilient non-linear function and feeding results from the sampling to perform efficient indexing of data and efficient routing of networking data sets.

19. The method of claim 18, further comprising:
  performing an error detection for the second data set, resulting in a third data set.

20. The method of claim 18, further comprising:
  generating a second pseudonumber with a second pseudorandom number generator.

21. The method of claim 18, further comprising:
  performing a non-linear function on the second data set and feeding the result into a cyclic redundancy check (CRC) circuit.

22. The method of claim 19, further comprising:
  performing a non-linear function on the second data set;
  performing efficient indexing of data; and
  performing efficient routing of networking data sets.

23. The method of claim 19, further comprising:
  extracting the second data set;
  using the extracted second data set as an initial state of a self-shrinking-generator circuit; and
  operating the self-shrinking generator circuit until an output of the desired size is obtained.

24. A non-transitory computer-readable medium in which a computer program for generating a message authentication code (MAC) is stored, which, when being executed by processors, is adapted to:
  generate a first pseudonumber with a first pseudorandom number generator;
  transmit the generated pseudonumber to central plain text mixer, wherein the central plain text mixer comprises a load-controlled linear feedback shift register (LFSR);
  perform a delinearization of a first data set at delayed random positions in the central plain text mixer based upon the generated pseudorandom to produce a second data set;
  detecting errors in the second data set using an error detection circuit, resulting in a third data set; and
  wherein the error detection circuit is implemented by sampling a state of the first circuit using a resilient non-linear function and feeding results from the sampling to perform efficient indexing of data and efficient routing of networking data sets.

* * * * *